United States Patent
Yanagawa et al.

(10) Patent No.: US 9,358,952 B2
(45) Date of Patent: Jun. 7, 2016

(54) PRETENSIONER MECHANISM

(71) Applicant: KABUSHIKI KAISHA TOKAI-RIKA-DENKI-SEISAKUSHO, Aichi (JP)

(72) Inventors: Wataru Yanagawa, Aichi-ken (JP); Masaru Ukita, Aichi-ken (JP); Hiroaki Yamazoe, Aichi-ken (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 200 days.

(21) Appl. No.: 14/232,333

(22) PCT Filed: Feb. 6, 2013

(86) PCT No.: PCT/JP2013/052757
§ 371 (c)(1),
(2) Date: Jan. 13, 2014

(87) PCT Pub. No.: WO2013/118780
PCT Pub. Date: Aug. 15, 2013

(65) Prior Publication Data
US 2014/0145021 A1    May 29, 2014

(30) Foreign Application Priority Data
Feb. 10, 2012   (JP) ................. 2012-027504

(51) Int. Cl.
*B60R 22/28* (2006.01)
*B60R 22/46* (2006.01)

(52) U.S. Cl.
CPC ................. *B60R 22/4633* (2013.01)

(58) Field of Classification Search
USPC .......................................... 242/374
See application file for complete search history.

(56) References Cited

U.S. PATENT DOCUMENTS

| 3,830,119 A | * | 8/1974 | Travis ................. B25B 23/1415 81/477 |
| 6,419,176 B1 | * | 7/2002 | Mizuno ............... B60R 22/4628 242/374 |
| 2012/0006927 A1 | | 1/2012 | Nagata et al. |

FOREIGN PATENT DOCUMENTS

| CN | 101306676 | 11/2008 |
| JP | H-06238977 | 8/1994 |
| JP | 2001-151077 | 6/2001 |

(Continued)

OTHER PUBLICATIONS

Notice of Reasons for Rejection CN office action dated Jun. 3, 2015.
(Continued)

*Primary Examiner* — Sang Kim
(74) *Attorney, Agent, or Firm* — Roberts Mlotkowski Safran & Cole, PC

(57) ABSTRACT

In a pretensioner mechanism, movement of a piston is anchored by an anchoring pin. The anchoring pin is crushed and the piston is allowed to move. Hence, a pinion is turned by a rack of the piston. A facilitating cavity is formed in the anchoring pin. Crushing and deformation of the anchoring pin in a diametric direction thereof due to a movement of the rack is facilitated by the facilitating cavity. Therefore, the anchoring pin may be easily crushed and deformed in the diametric direction by the movement of the rack, and the action of the anchoring pin caused by the movement of the rack may be effectively made consistent.

19 Claims, 14 Drawing Sheets

(56) References Cited

FOREIGN PATENT DOCUMENTS

| | | |
|---|---|---|
| JP | 2003-535751 | 12/2003 |
| JP | 2008-285136 | 11/2008 |

OTHER PUBLICATIONS

Notice of Reasons for Rejection JP office action dated Jan. 6, 2015.
Extended European Search Report dated Sep. 17, 2015.

* cited by examiner

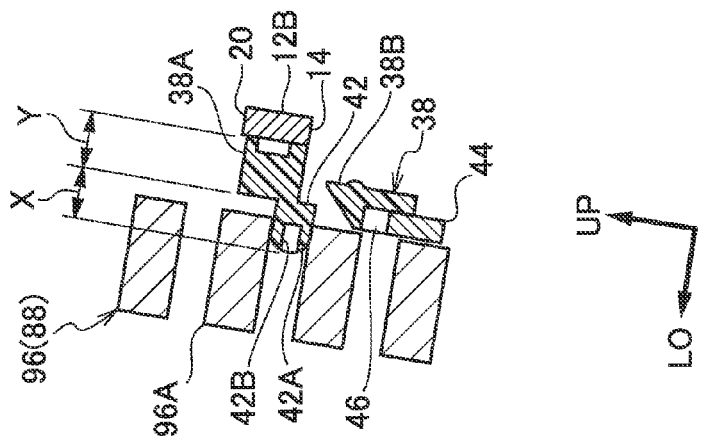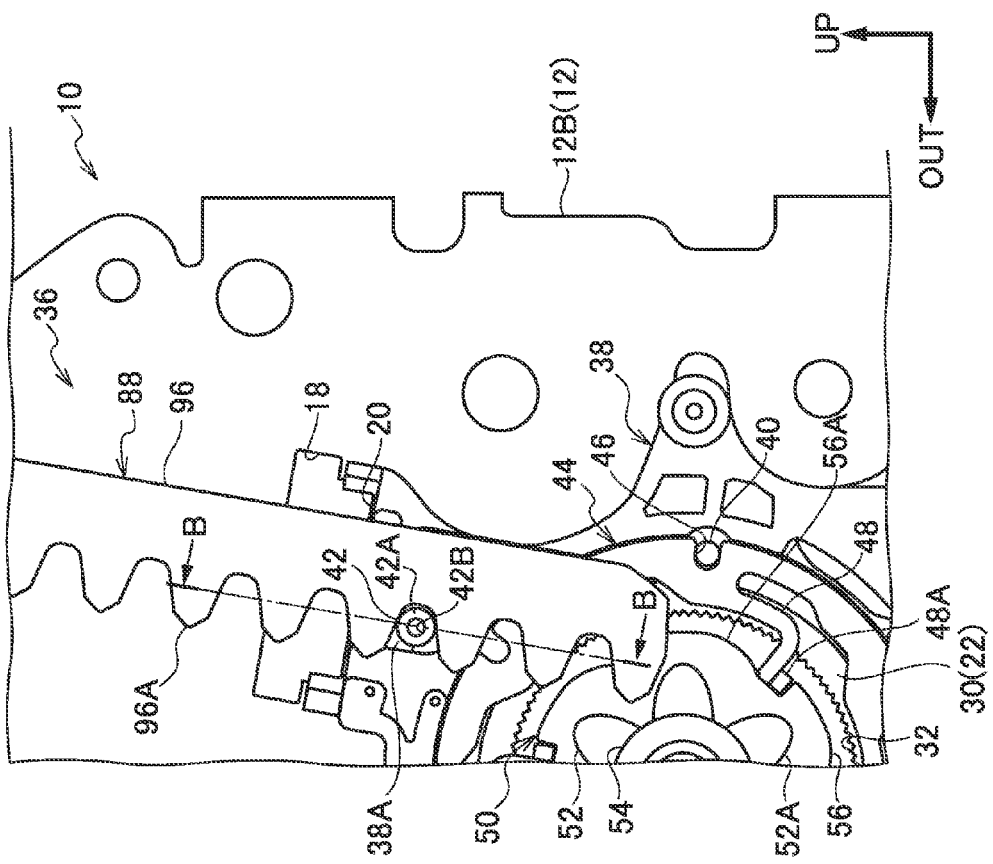

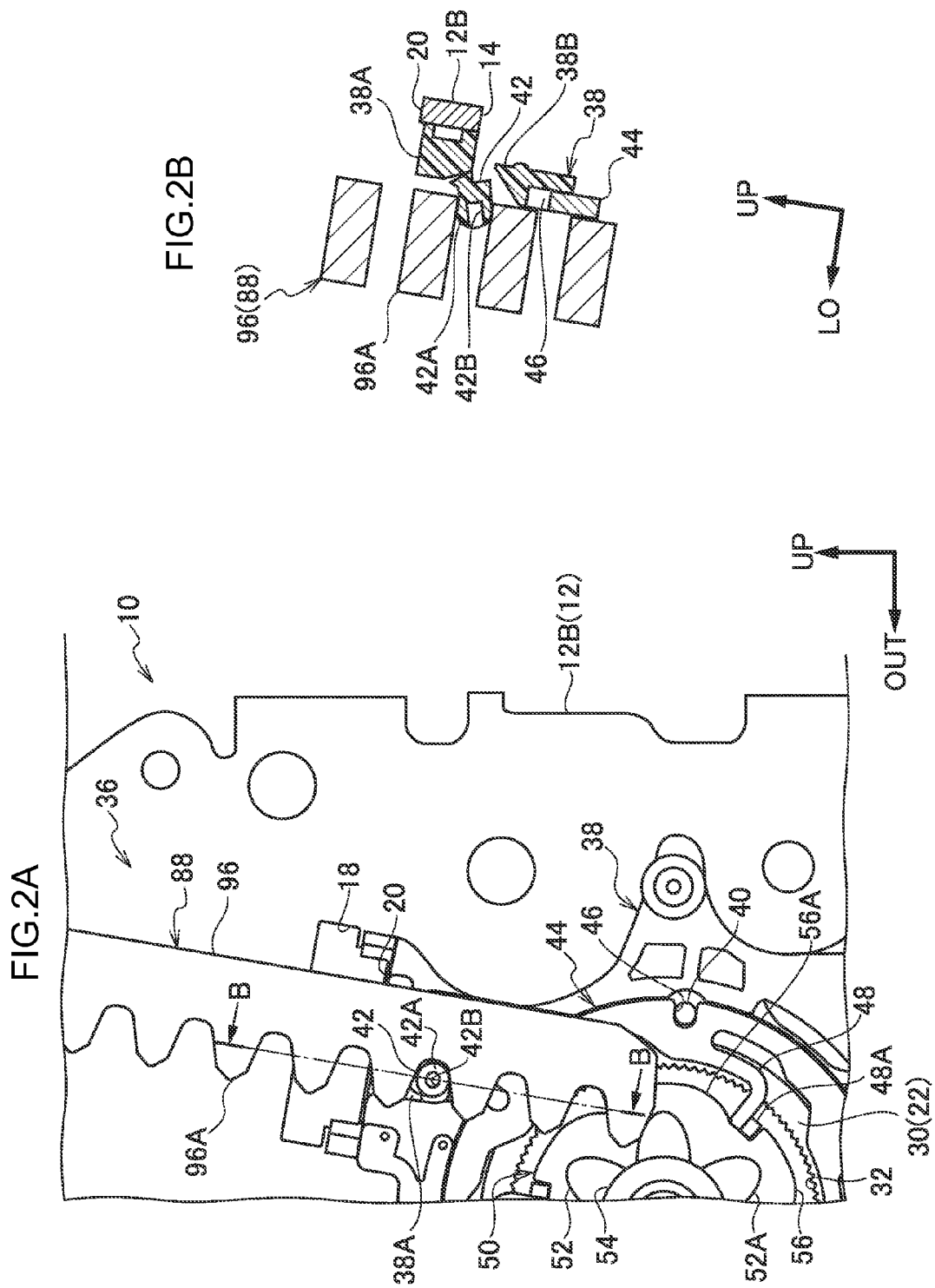

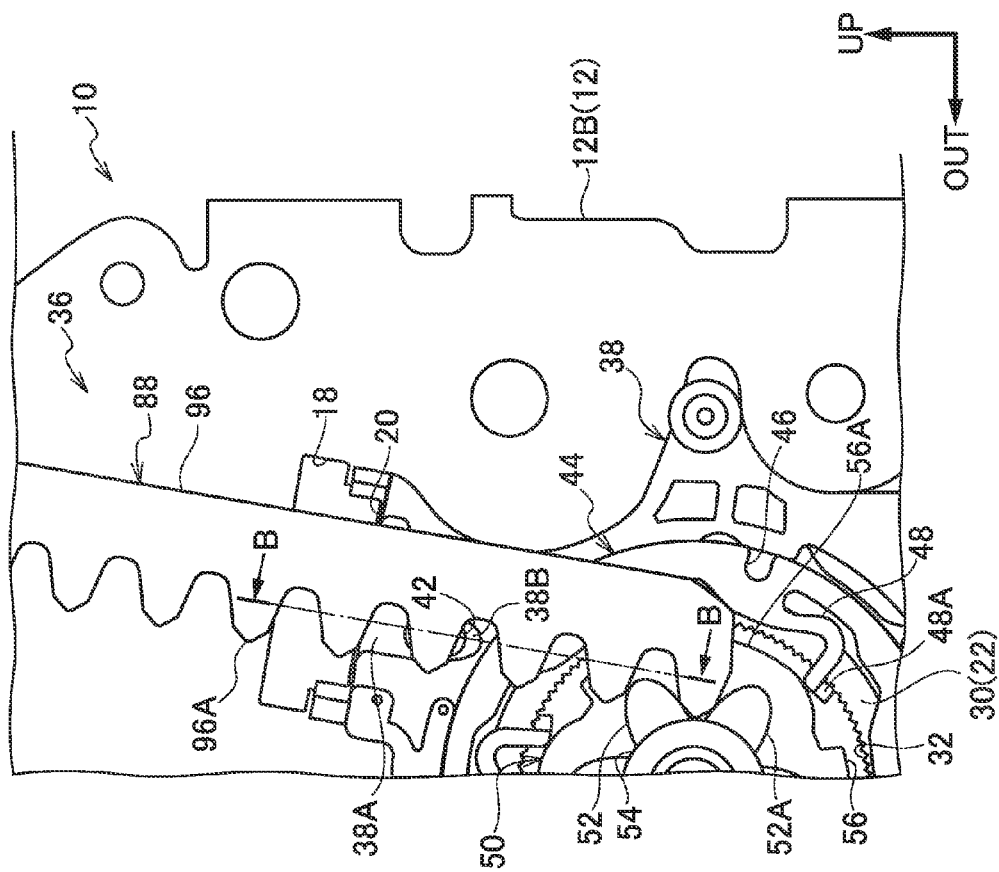

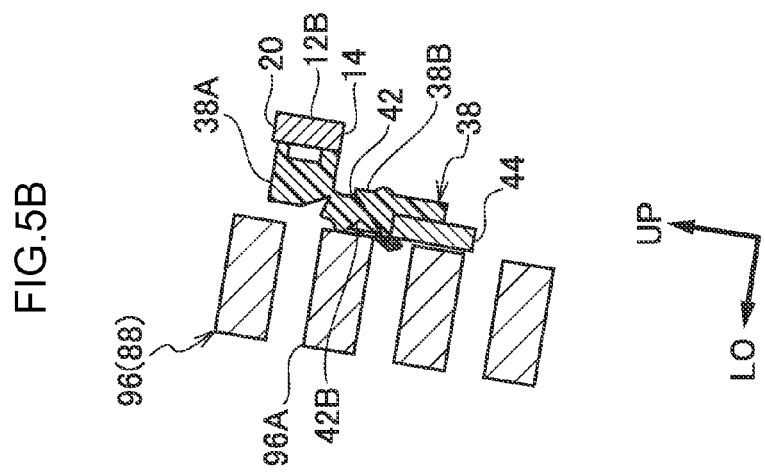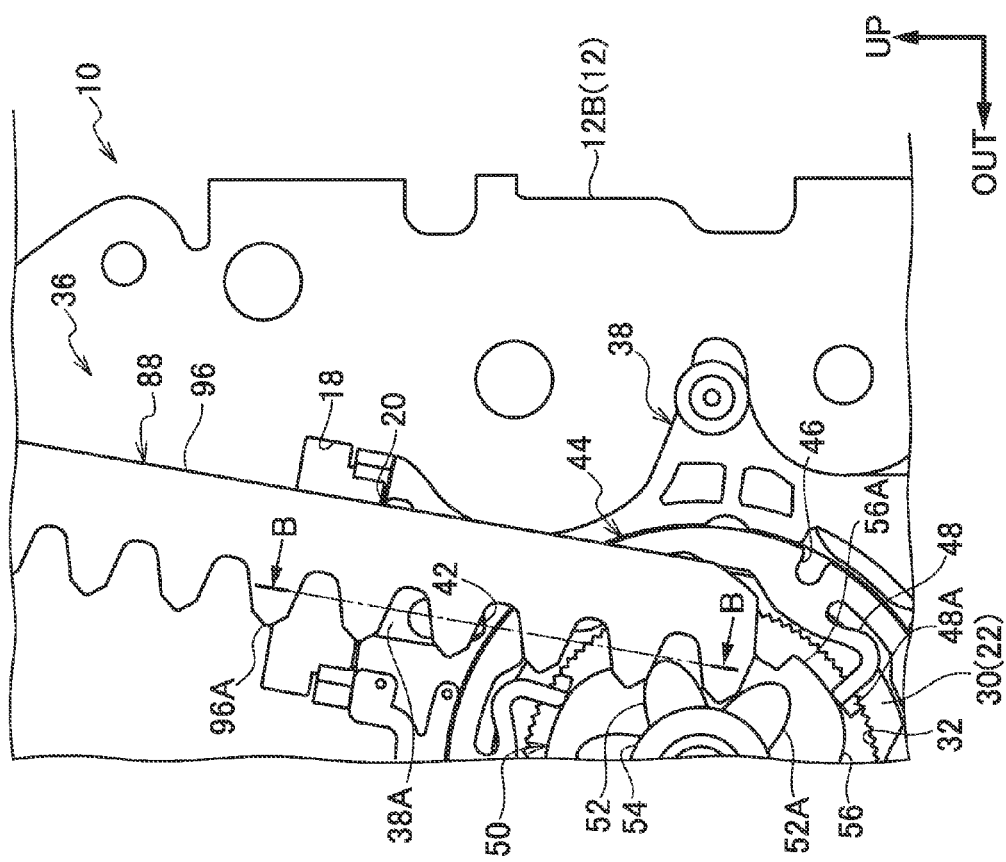

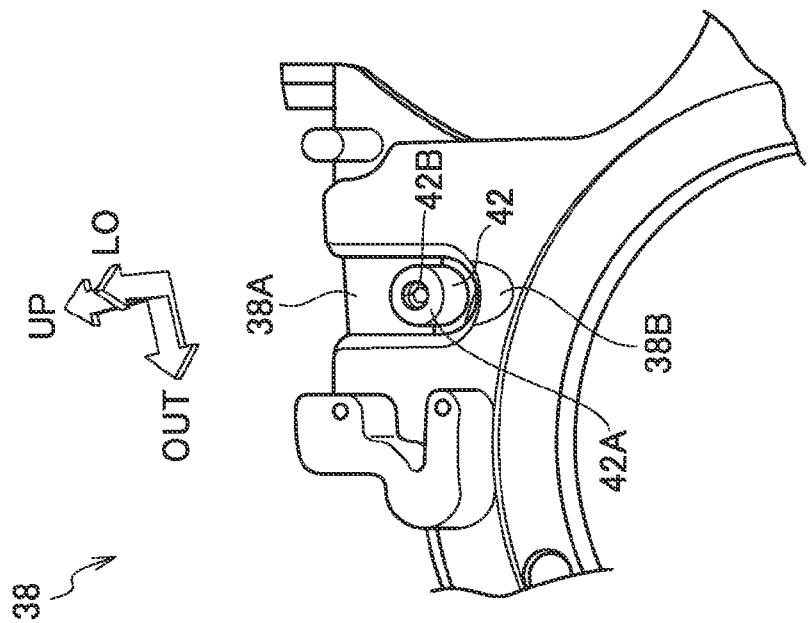
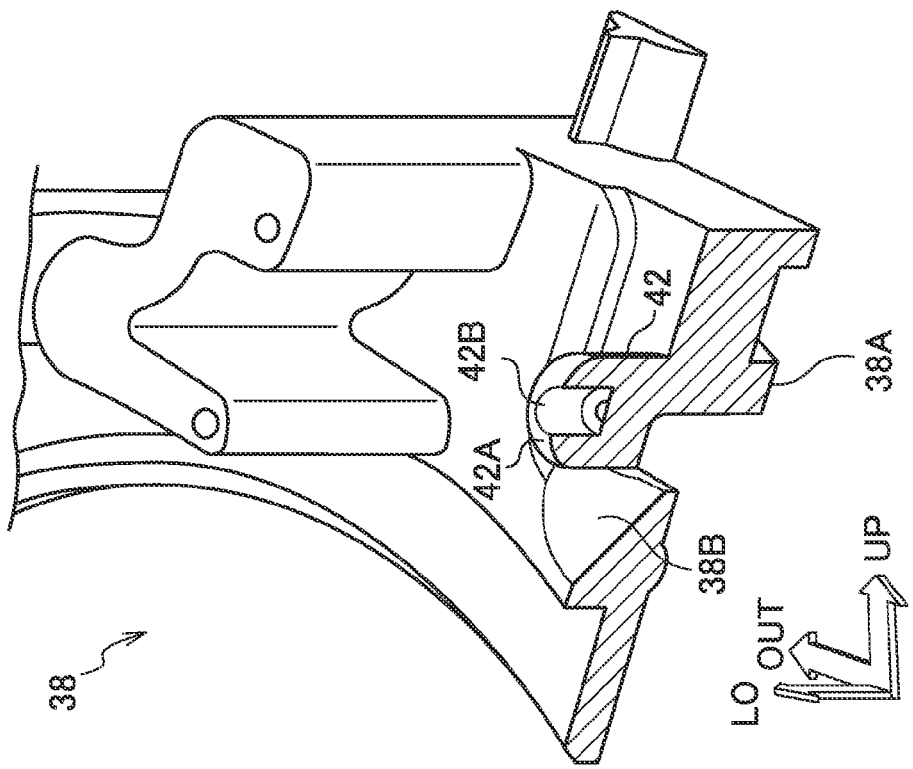

PRETENSIONER MECHANISM

TECHNICAL FIELD

The present invention relates to a pretensioner mechanism that increases a restraining force on an occupant from a webbing by moving a moving member.

BACKGROUND ART

In a pretensioner recited in Japanese Patent Application Laid-Open (JP-A) No. 2008-285136, a position fixing piece in the form of a folded plate anchors movement of a piston. When the position fixing piece is crushed and the piston is moved, a gear member is turned and a restraining force on an occupant from a webbing is increased.

In this pretensioner, it is preferable if an action of the position fixing piece that is caused by movement of the piston is effectively made consistent, particularly if the position fixing piece is formed in a rod shape.

SUMMARY OF INVENTION

Technical Problem

In consideration of the situation described above, an object of the present invention is to provide a pretensioner mechanism in which an action of an anchoring portion that is caused by movement of a moving member may be effectively made consistent.

Solution to Problem

A pretensioner mechanism according to a first aspect of the present invention includes: a webbing that is capable of restraining an occupant of a vehicle; a moving member, a restraining force on the occupant from the webbing being increased by the moving member being moved; and an anchoring portion that is formed in a rod shape and anchors movement of the moving member, a slope surface being provided between a top end face and a side face of the anchoring portion, movement of the moving member being allowed by the anchoring portion being crushed, and the anchoring portion being provided with a facilitating portion that facilitates crushing of the anchoring portion in a diametric direction thereof by movement of the moving member.

In the pretensioner mechanism of the first aspect of the present invention, the rod-shaped anchoring portion anchors the movement of the moving member. When the anchoring portion is crushed and the moving member is moved, the restraining force on an occupant from the webbing is increased. In addition, the slope surface is formed between the top end face and the side face of the anchoring portion.

The facilitating portion is provided at the anchoring portion, and facilitates crushing of the anchoring portion in the diametric direction by the movement of the moving member. Therefore, the anchoring portion may easily be crushed in the diametric direction, and the action of the anchoring portion that is caused by the movement of the moving member may be effectively made consistent.

In a pretensioner mechanism according to a second aspect of the present invention, in the pretensioner mechanism of the first aspect of the present invention, the facilitating portion is provided at a region of the anchoring portion at the top end side thereof.

In the pretensioner mechanism of the second aspect of the present invention, the facilitating portion is provided at the top end side region of the anchoring portion. Therefore, the anchoring portion may be crushed in the diametric direction even more easily, and the action of the anchoring portion that is caused by the movement of the moving member may be even more effectively made consistent.

In a pretensioner mechanism according to a third aspect of the present invention, in the pretensioner mechanism of the first aspect or second aspect of the present invention, the facilitating portion extends in an axial direction of the anchoring portion.

In the pretensioner mechanism of the third aspect of the present invention, because the facilitating portion extends in the axial direction of the anchoring portion, the anchoring portion may be crushed in the diametric direction even more easily, and the action of the anchoring portion that is caused by the movement of the moving member may be even more effectively made consistent.

A pretensioner mechanism according to a fourth aspect of the present invention includes: a webbing that is capable of restraining an occupant of a vehicle; a moving member that is capable of moving; an anchoring portion that anchors movement of the moving member, movement of the moving member being allowed by the anchoring portion being crushed; a turning member, the turning member being turned and a restraining force on the occupant from the webbing being increased by the moving member being moved; and an inhibiting portion that is provided between the anchoring portion and the turning member, the inhibiting portion inhibiting contact between the crushed anchoring portion and the turning member.

In the pretensioner mechanism of the fourth aspect of the present invention, the anchoring portion anchors movement of the moving member. When the anchoring portion is crushed and the moving portion is moved, the turning member is turned and the restraining force on an occupant from the webbing is increased.

The inhibiting portion is provided between the anchoring portion and the turning member, and the inhibiting portion inhibits contact of the crushed anchoring portion with the turning member. Therefore, the action of the anchoring portion that is caused by the movement of the moving member may be effectively made consistent.

BRIEF DESCRIPTION OF DRAWINGS

FIG. 1A is a side view, viewed from a vehicle front-and-rear direction one side, showing principal portions of a pretensioner mechanism in accordance with an exemplary embodiment of the present invention.

FIG. 1B is a sectional view, taken along line B-B of FIG. 1A, showing the principal portions of the pretensioner mechanism in accordance with the exemplary embodiment of the present invention.

FIG. 2A is a side view, viewed from the vehicle front-and-rear direction one side, showing the principal portions of the pretensioner mechanism in accordance with the exemplary embodiment of the present invention at a first stage of operation.

FIG. 2B is a sectional view, taken along line B-B of FIG. 2A, showing the principal portions of the pretensioner mechanism in accordance with the exemplary embodiment of the present invention at the first stage of operation.

FIG. 4A is a side view, viewed from the vehicle front-and-rear direction one side, showing the principal portions of the pretensioner mechanism in accordance with the exemplary embodiment of the present invention at a third stage of operation.

FIG. 4B is a sectional view, taken along line B-B of FIG. 4A, showing the principal portions of the pretensioner mechanism in accordance with the exemplary embodiment of the present invention at the third stage of operation.

FIG. 5A is a side view, viewed from the vehicle front-and-rear direction one side, showing the principal portions of the pretensioner mechanism in accordance with the exemplary embodiment of the present invention at a fourth stage of operation.

FIG. 5B is a sectional view, taken along line B-B of FIG. 5A, showing the principal portions of the pretensioner mechanism in accordance with the exemplary embodiment of the present invention at the fourth stage of operation.

FIG. 7A is a perspective view, viewed from the vehicle width direction inner side and the vehicle front-and-rear direction one side, showing principal portions of the gear case of the pretensioner mechanism in accordance with the exemplary embodiment of the present invention.

FIG. 7B is a perspective view, viewed from the vehicle front-and-rear direction one side and a lower side, showing the principal portions of the gear case of the pretensioner mechanism in accordance with the exemplary embodiment of the present invention.

DESCRIPTION OF EMBODIMENTS

Figure 8:
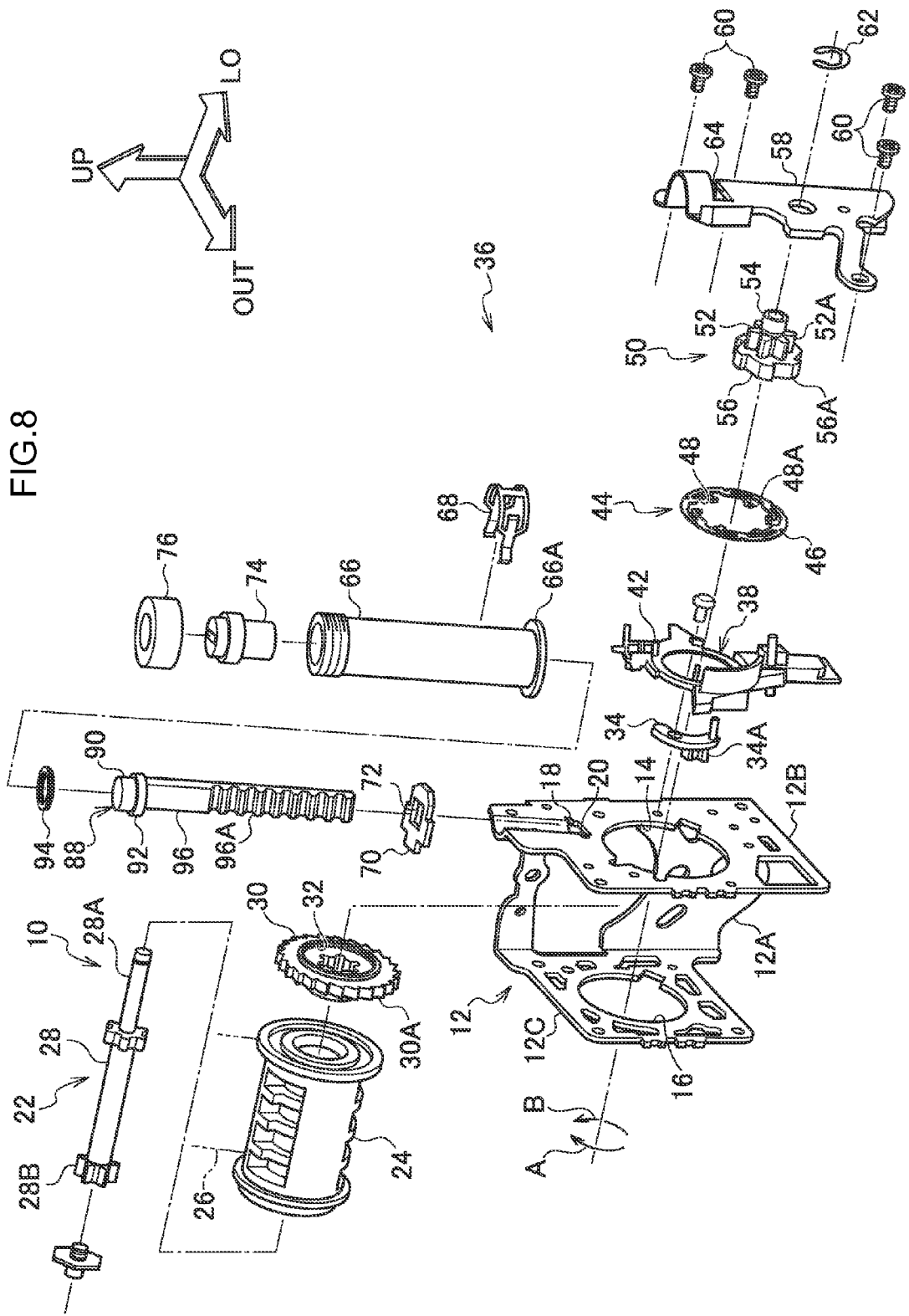
FIG. 8 is an exploded perspective diagram, viewed from the vehicle width direction outer side and the vehicle front-and-rear direction one side, showing a webbing winding device in accordance with the exemplary embodiment of the present invention.
Figure 9:
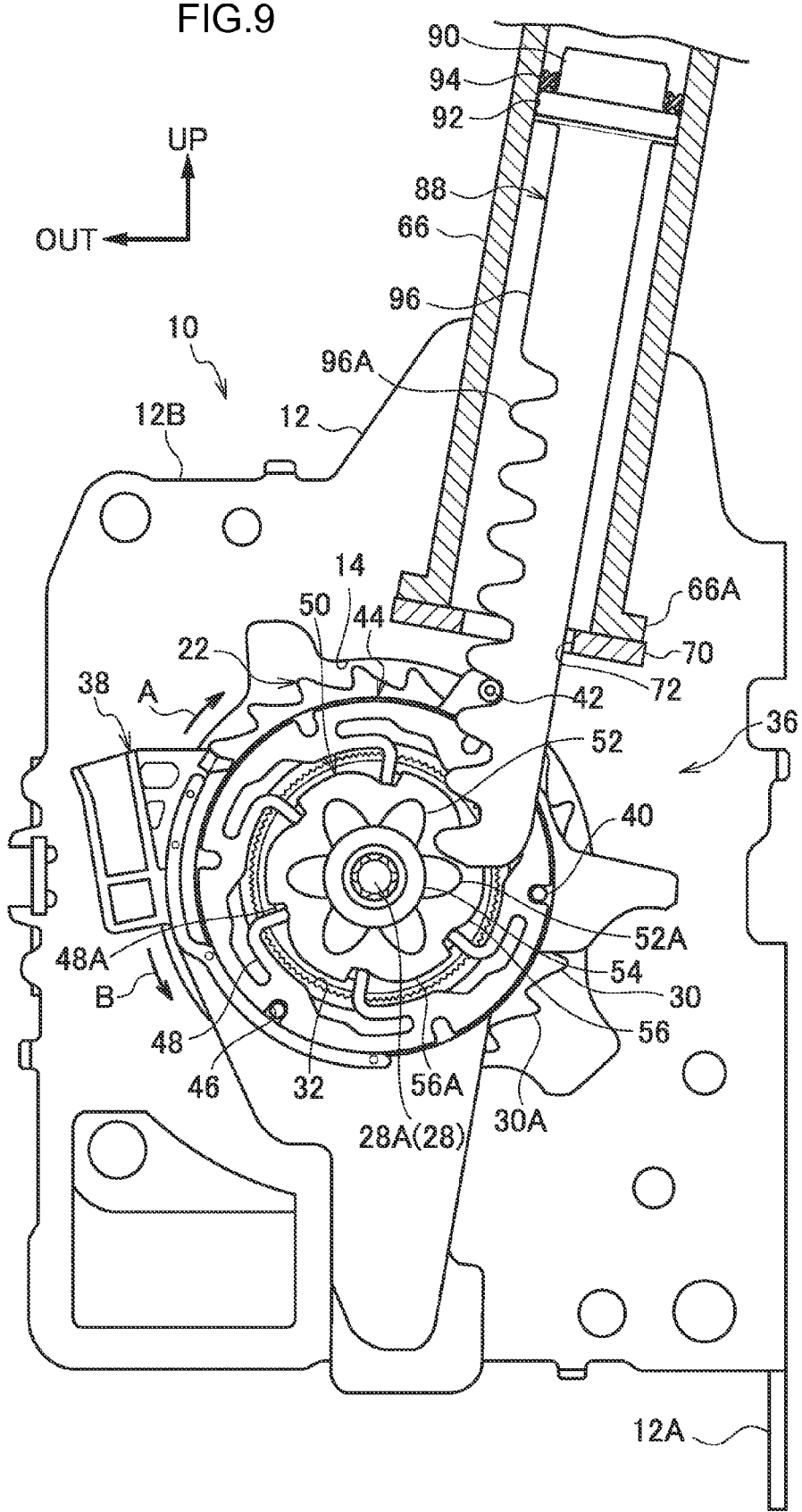
FIG. 9 is a side view, viewed from the vehicle front-and-rear direction one side, showing the webbing winding device in accordance with the exemplary embodiment of the present invention.

FIG. 8 shows an exploded perspective diagram in which a webbing winding device 10 employing a pretensioner mechanism 36 in accordance with an exemplary embodiment of the present invention is viewed from an outer side in a vehicle width direction and one side in a vehicle front-and-rear direction. FIG. 9 shows a side view in which the webbing winding device 10 is viewed from the vehicle front-and-rear direction one side. In the drawings, the vehicle width direction outer side is indicated with the arrow OUT, the vehicle front-and-rear direction one side is indicated with the arrow LO, and an upper side is indicated with the arrow UP.

As shown in FIG. 8 and FIG. 9, a frame 12 in the form of a plate with a "U" shape in cross-section is provided at the webbing winding device 10 of the present exemplary embodiment to serve as a main body member. The frame 12 is provided with a rear plate 12A at the vehicle width direction inner side, a leg plate 12B at the vehicle front-and-rear direction one side, and a leg plate 12C at the other side in the vehicle front-and-rear direction. The webbing winding device 10 is fixed, at the rear plate 12A of the frame 12, inside a pillar with a rectangular tube shape (not shown in the drawings) that serves as a vehicle framework member. Thus, the webbing winding device 10 is installed in the vehicle.

An arrangement hole 14 and an arrangement hole 16 that are each circular are formed penetrating through the leg plate 12B and the leg plate 12C, respectively. The arrangement hole 14 and the arrangement hole 16 oppose one another. A long, narrow, rectangular first anchoring hole 18 is formed penetrating through the rear plate 12A side of the leg plate 12B at the upper side of the arrangement hole 14. The first anchoring hole 18 is disposed to be substantially horizontal. A long, narrow, rectangular second anchoring hole 20 is formed penetrating through the leg plate 12B just below the first anchoring hole 18. The second anchoring hole 20 is disposed to be parallel with the first anchoring hole 18, and is in communication with the first anchoring hole 18.

A winding shaft 22 is rotatably supported between the leg plate 12B (the arrangement hole 14) and the leg plate 12C (the arrangement hole 16) of the frame 12.

A substantially circular tube-shaped spool 24 is provided at the winding shaft 22 to serve as a winding member. A long, narrow belt-shaped webbing 26 (a seatbelt) is wound, from a proximal end side thereof, onto the spool 24. The webbing 26 is drawn upward from the frame 12, and may be applied to an occupant sitting on a seat of the vehicle (not shown in the drawings). The webbing 26 can be wound onto the spool 24 by the spool 24 turning in a winding direction (the direction of arrow A in FIG. 8 and FIG. 9), and the spool 24 can be turned in an unwinding direction (the direction of arrow B in FIG. 8 and FIG. 9) by the webbing 26 being pulled out from the spool 24.

A torsion shaft 28 is coaxially inserted into the spool 24 to serve as an energy-absorbing member that structures a force limiter mechanism. One end 28A of the torsion shaft 28 at the leg plate 12B side thereof protrudes from one end face of the spool 24 at the leg plate 12B side thereof. An other end 28B of the torsion shaft 28 at the leg plate 12C side thereof is fixed inside the other end of the spool 24 at the leg plate 12C side thereof to be non-rotatable with respect thereto. Thus, the torsion shaft 28 is made turnable integrally with the spool 24.

A lock gear 30 with a substantially circular tube shape is provided at one end of the spool 24 to serve as a locking member. The torsion shaft 28 is coaxially passed through the lock gear 30. The torsion shaft 28 is fixed to the lock gear 30 to be non-rotatable with respect thereto. Thus, the lock gear 30 is made rotatable integrally with the torsion shaft 28. Ratchet teeth 30A (outward teeth) are formed at the whole of the outer periphery of the lock gear 30.

A clutch recess portion 32 in a circular tube shape is formed in a face of the lock gear 30 at the opposite side thereof from the side at which the spool 24 is disposed. The clutch recess portion 32 structures a clutch mechanism. An outer periphery surface of the clutch recess portion 32 has a high coefficient of friction.

A spiral spring (not shown in the drawings) is disposed at the outer side of the leg plate 12C of the frame 12 to serve as an urging member. The spiral spring is joined to the spool 24, and applies an urging force in the winding direction to the spool 24.

A plate-shaped lock plate 34 is turnably supported at the leg plate 12B of the frame 12 in the vicinity of the arrangement hole 14, to serve as a restricting member. A lock tooth 34A is formed at the lock plate 34. The lock plate 34 is connected to a locking mechanism (not shown in the drawings) that serves as a restricting unit (a locking unit). If the webbing 26 is rapidly pulled out from the spool 24 or the vehicle rapidly decelerates or the like, the lock plate 34 is turned by operation of the locking mechanism, and the lock tooth 34A meshes (engages) with the ratchet teeth 30A of the lock gear 30. Hence, turning of the lock gear 30 in the unwinding direction is restricted (locked), and turning of the spool 24 in the unwinding direction is restricted (while turning of the spool 24 in the winding direction is allowed).

The pretensioner mechanism 36 is provided at the outer side of the leg plate 12B of the frame 12. The pretensioner mechanism 36 is formed by a rack and pinion system.

A gear case 38, in the form of a substantially circular annular plate made of resin, is provided at the pretensioner mechanism 36 to serve as an anchoring member. The gear case 38 is fixed to the leg plate 12B. An outer periphery portion of the gear case 38 covers an outer periphery region of the lock gear 30. The clutch recess portion 32 of the lock gear 30 is disposed inside the gear case 38, and the one end 28A of the torsion shaft 28 penetrates through the inside of the gear case 38.

A predetermined number of circular rod-shaped retention pins 40 (shear pins) are integrally formed at the outer periphery portion of the gear case 38 to serve as retention portions. Each retention pin 40 protrudes from the gear case 38 toward the opposite side thereof from the side at which the lock gear 30 is disposed.

Figure 6:
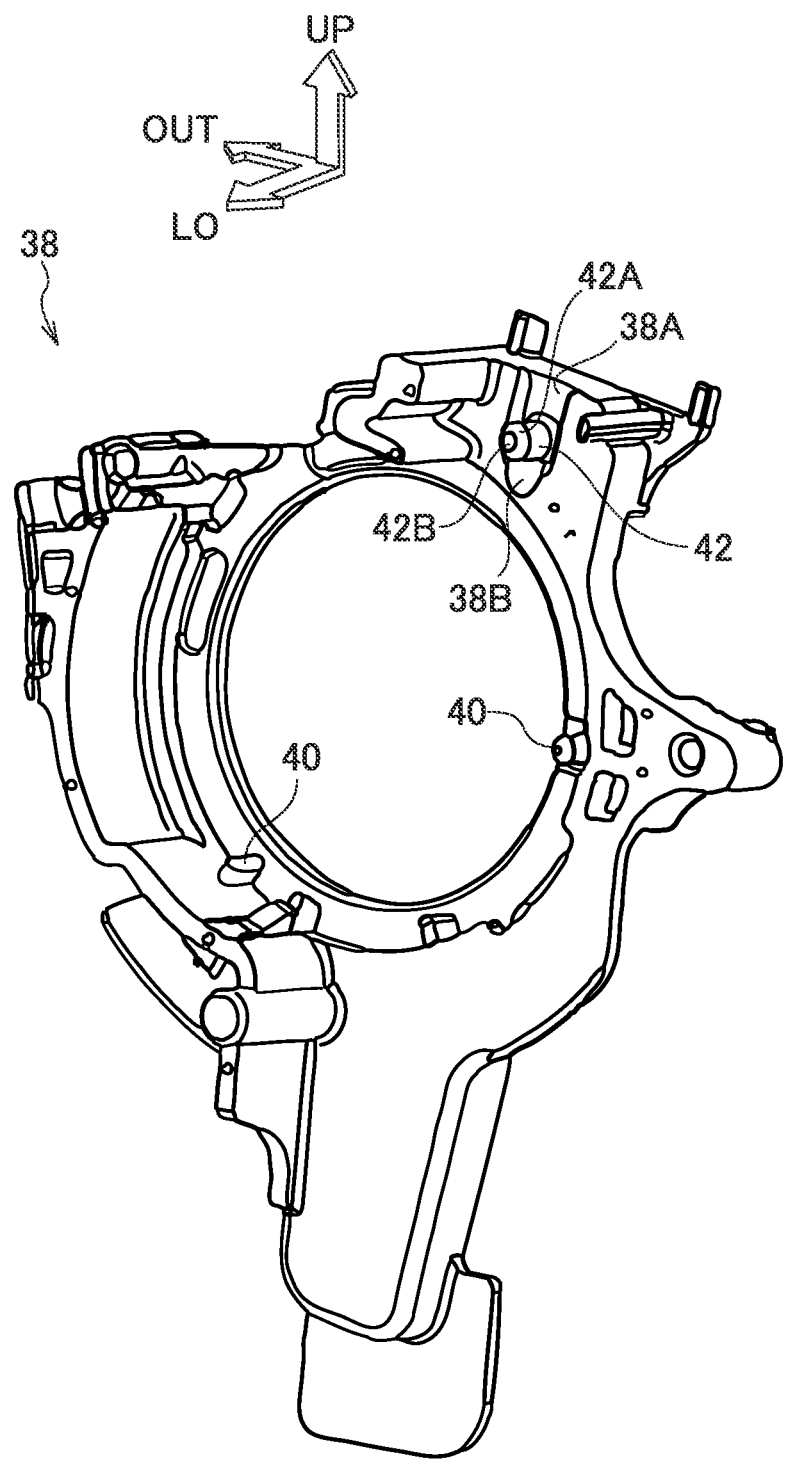
FIG. 6 is a perspective view, viewed from a vehicle width direction inner side and the vehicle front-and-rear direction one side, showing a gear case of the pretensioner mechanism in accordance with the exemplary embodiment of the present invention.

As is shown in detail in FIG. 6, FIG. 7A and FIG. 7B, a substantially circular rod-shaped anchoring pin 42 (a shear pin) is integrally formed at an upper portion of the gear case 38. The anchoring pin 42 protrudes from the gear case 38 to the opposite side thereof from the side at which the leg plate 12B is disposed. A slope surface 42A (an inclined face) is formed at a top end portion (a protrusion top end portion) of the anchoring pin 42, between a periphery surface (a side face) and a top end face thereof. The top end portion of the anchoring pin 42 is progressively reduced in diameter by the slope surface 42A from a proximal end side thereof (a protrusion proximal end side) to the top end side. A cylindrical facilitating cavity 42B is formed in a top end side region of the anchoring pin 42 to serve as a facilitating portion. The strength of the top end side region of the anchoring pin 42 is lowered by the facilitating cavity 42B (the meaning of the term "the top end side region of the anchoring pin 42" is intended to include an axial direction range of the anchoring pin 42 in which the facilitating cavity 42B is formed). The facilitating cavity 42B is disposed coaxially with the anchoring pin 42 and extends (is made long) in the axial direction (length direction) of the anchoring pin 42. The facilitating cavity 42B opens in the top end face of the anchoring pin 42.

A substantially cuboid-shaped support portion 38A is formed at an upper portion of the gear case 38, at a region at the leg plate 12B side relative to the anchoring pin 42. An upper side portion of the anchoring pin 42 is made integral with a lower side portion of the support portion 38A, and the anchoring pin 42 is supported by the support portion 38A. A lower side portion of the anchoring pin 42 is not made integral with the gear case 38 (i.e., is separated therefrom). As is shown in detail in FIG. 1B, an axial direction dimension X of the anchoring pin 42 is less than a plate thickness dimension Y of the support portion 38A (it is sufficient if the axial direction dimension X is not more than the plate thickness dimension Y of the support portion 38A). A radius of curvature of a boundary region between the anchoring pin 42 and the support portion 38A is small.

A bowl-shaped receiving portion 38B (with a substantially trapezoid shape in cross section) is formed in an upper portion of the gear case 38, in a region at the lower side relative to the anchoring pin 42. An upper side face of the receiving portion 38B is curved in a recessed shape in a cross section along a circumferential direction of the gear case 38. The upper side face of the receiving portion 38B is angled in a direction that inclines away from the leg plate 12B toward the lower side.

As shown in FIG. 8 and FIG. 9, a clutch plate 44 in the form of a substantially circular annular plate is disposed at the opposite side of the gear case 38 from the side thereof at which the lock gear 30 is disposed, to serve as a turning member that structures a clutch mechanism. A predetermined number of semicircular fitting holes 46 are formed in an outer periphery edge of the clutch plate 44. The predetermined number of fitting holes 46 are disposed at equal intervals along the circumferential direction of the clutch plate 44. The retention pins 40 of the gear case 38 fit into the fitting holes 46. Thus, the clutch plate 44 is retained at the gear case 38. As shown in detail in FIG. 1B, the receiving portion 38B of the gear case 38 is disposed between the clutch plate 44 and the anchoring pin 42 of the gear case 38. Thus, the receiving portion 38B covers the whole plate thickness direction of a region at the anchoring pin 42 side of the clutch plate 44.

A predetermined number (six in the present exemplary embodiment) of projecting portions 48 are integrally formed at the inner periphery of the clutch plate 44 in the form of "L"-shaped plates. The projecting portions 48 are disposed at equal intervals along the circumferential direction of the clutch plate 44. Rod-shaped meshing portions 48A are integrally formed at the top ends of the projecting portions 48. The meshing portions 48A protrude towards the gear case 38 from the projecting portions 48, and are inserted through the inner side of the gear case 38 into the clutch recess portion 32 of the lock gear 30. The meshing portions 48A are separated from an outer periphery face of the clutch recess portion 32. Thus, the clutch plate 44 allows turning of the lock gear 30.

A pinion 50 that serves as a driving member is provided at an inner periphery side of the clutch plate 44. The one end 28A of the torsion shaft 28 coaxially and relatively rotatably penetrates through the pinion 50. A gear wheel 52 is provided at an axial direction middle region of the pinion 50. Pinion teeth 52A are formed at the whole of the outer periphery of the gear wheel 52. A support tube 54 in a circular tube shape is coaxially formed at a region of the pinion 50 at the opposite side thereof from the side at which the lock gear 30 is disposed.

A clutch portion 56 that structures the clutch mechanism is formed at a region of the pinion 50 at the lock gear 30 side thereof. The clutch portion 56 is inserted into the clutch recess portion 32 of the lock gear 30. A predetermined number (six in the present exemplary embodiment) of protrusion portions 56A are formed at an outer periphery face of the clutch portion 56. The predetermined number of protrusion portions 56A are disposed at equal intervals along the circumferential direction of the clutch portion 56, and the protrusion height of each protrusion portion 56A gradually increases in the unwinding direction. The meshing portions 48A of the clutch plate 44 are fitted (abutted) against the clutch portion 56 at winding direction side portions of the protrusion portions 56A. Thus, the pinion 50 is retained at the clutch plate 44.

A cover plate 58 in the form of a plate made of metal is provided at the outer side of the leg plate 12B of the frame 12, to serve as a mounting member. The cover plate 58 is fitted (fastened) to the leg plate 12B by two fixing screws 60, which serve as fixing members, in a region at the rear plate 12A side of an upper portion of the leg plate 12B. The cover plate 58 is also fixed (fastened) to the leg plate 12B by respective single fixing screws 60 in each of a region at the rear plate 12A side of a lower portion of the leg plate 12B and a region of the lower portion at the opposite side thereof from the rear plate 12A. Thus, the cover plate 58 is fixed to the leg plate 12B. The cover plate 58 covers the gear case 38, the clutch plate 44 and the pinion 50 from the opposite side thereof from the side at which the lock gear 30 is disposed.

The support tube 54 of the pinion 50 penetrates through the cover plate 58. Thus, the cover plate 58 rotatably supports the pinion 50. A K-ring 62 with a substantial "C" shape in a front view is fitted and fixed to the support tube 54 of the pinion 50 beyond the cover plate 58, at the opposite side thereof from the side at which the leg plate 12B is disposed, to serve as a fixing member. The K-ring 62 is anchored at the cover plate 58, and restricts detachment of the pinion 50 from the cover plate 58.

A third anchoring hole 64 with a long, narrow rectangular shape is formed penetrating through an upper portion of the cover plate 58. The third anchoring hole 64 is disposed to be substantially horizontal, and opposes the first anchoring hole 18 and second anchoring hole 20 of the leg plate 12B.

A circular tube-shaped cylinder 66 made of metal is provided between an upper portion of the leg plate 12B of the frame 12 and an upper portion of the cover plate 58, to serve as a tube member. The cylinder 66 extends to the upper side beyond the leg plate 12B and the cover plate 58.

The cylinder 66 fits into a cylinder holder 68 in the form of a plate with a substantial "U" shape in cross section, at the upper side of the cover plate 58. The cylinder holder 68 is engaged with the upper portion of the leg plate 12B at each of two length direction end portions of the cylinder holder 68, and is fixed to the leg plate 12B. Thus, the cylinder holder 68 limits movement of the cylinder 66 in an axial direction thereof and retains the cylinder 66.

A peripheral rim portion 66A is integrally formed at the lower end of the cylinder 66. The peripheral rim portion 66A protrudes along the whole of the outer periphery of the lower end of the cylinder 66. The peripheral rim portion 66A fits into the first anchoring hole 18 of the leg plate 12B and an upper side region of the third anchoring hole 64 of the cover plate 58.

A piston stopper 70 in the form of a substantially rectangular plate is disposed just below the cylinder 66 to serve as a stopper member. The piston stopper 70 abuts against (makes area contact with) the lower end of the cylinder 66 (including the peripheral rim portion 66A), and fits into the second anchoring hole 20 of the leg plate 12B and a lower side region of the third anchoring hole 64 of the cover plate 58. Thus, movement of the piston stopper 70 and movement of the cylinder 66 in the axial direction are anchored, and the piston stopper 70 and cylinder 66 are fixed between the leg plate 12B and the cover plate 58.

A rectangular insertion hole 72 is formed penetrating through the piston stopper 70. Through the insertion hole 72, the interior of the cylinder 66 opens at the upper side of the pinion 50.

A gas generator 74 with a substantially circular rod shape is inserted into the upper end of the cylinder 66 to serve as a gas supply unit. The gas generator 74 closes off the upper end of the cylinder 66. A cap 76 in the form of a circular tube with one end closed off is fixed to the upper end of the cylinder 66 to serve as a fixing member. The gas generator 74 is fixed inside the upper end of the cylinder 66 by an upper wall (a bottom wall) of the cap 76 being anchored at an upper face of the gas generator 74.

The gas generator 74 is electronically connected to a control device (not shown in the drawings) of the vehicle. When there is a collision of the vehicle (a predetermined trigger, which is a sudden deceleration of the vehicle when a vehicle collision is detected), the pretensioner mechanism 36 is actuated under the control of the control device, the gas generator 74 momentarily generates high-pressure gas, and the gas generator 74 supplies the gas into the upper end of the interior of the cylinder 66.

A piston 88 made of metal is provided inside the cylinder 66 to serve as a moving member.

A circular rod-shaped proximal portion 90 is provided at the upper end of the piston 88. The proximal portion 90 is disposed coaxially with the cylinder 66. A circular disc-shaped flange 92 is provided at the piston 88, just below the proximal portion 90. The flange 92 is disposed coaxially with the cylinder 66, protrudes along the whole of the outer periphery of the proximal portion 90, and substantially fits to the inner periphery face of the cylinder 66.

An X-ring 94 in a circular annular shape with an "X" shape in cross section is disposed at the outer periphery of the proximal portion 90 to serve as a sealing member. The X-ring 94 is made of rubber or the like, and features resilience and sealing effectiveness. The X-ring 94 is in contact, over the whole periphery, with the outer periphery face of the proximal portion 90, an upper face of the flange 92 and the inner periphery face of the cylinder 66, in a state in which the X-ring 94 is resiliently deformed. Thus, the X-ring 94 seals gaps between the cylinder 66 and the piston 88.

A rack 96 in the shape of a substantially rectangular rod is provided at the piston 88, at the lower side relative to the flange 92. Rack teeth 96A are formed in a plural number along an axial direction at a portion of the rack 96 at the opposite side thereof from the side at which the rear plate 12A is disposed. The rack 96 protrudes from the lower side of the cylinder 66 and is inserted through the insertion hole 72 of the piston stopper 70, and the rack teeth 96A are anchored at the anchoring pin 42 of the gear case 38. Thus, movement (sliding) of the piston 88 to the lower side is anchored, and the lower end of the rack 96 is disposed in a vicinity of the upper side of the gear wheel 52 of the pinion 50.

As shown in detail in FIG. 1B, with respect to an end face of the rack 96 (the rack teeth 96A) at the side thereof at which the leg plate 12B is disposed, a bottom face of the facilitating cavity 42B of the anchoring pin 42 of the gear case 38 (a face at the side of the facilitating cavity 42B at which the support portion 38A is disposed) is disposed at the opposite side of this end face from the leg plate 12B (and may be disposed at the same position as the leg plate 12B side end face of the rack 96 (the rack teeth 96A)). Thus, the facilitating cavity 42B is provided only in a portion of the anchoring pin 42 that is disposed between the rack teeth 96A.

Now, operation of the present exemplary embodiment is described.

In the webbing winding device 10 with the structure described above, when the webbing 26 is applied to an occupant sitting on the seat of the vehicle, looseness of the webbing 26 is eliminated by the spiral spring applying urging force to the spool 24 in the winding direction.

When there is a collision of the vehicle, the webbing 26 is suddenly drawn out from the spool 24 or the vehicle rapidly decelerates, and the locking mechanism is activated. Accordingly, the lock tooth 34A of the lock plate 34 is meshed with the ratchet teeth 30A of the lock gear 30. As a result, rotation of the lock gear 30 in the unwinding direction is restricted, and rotation of the spool 24 in the unwinding direction is restricted. Therefore, unwinding of the webbing 26 from the spool 24 is restricted, and the webbing 26 restrains the occupant.

Additionally at the time of collision of the vehicle, the pretensioner mechanism 36 is activated under the control of the control device, and the gas generator 74 momentarily produces high-pressure gas and supplies the gas to the upper end of the interior of the cylinder 66. As a result, with the state in which gaps between the cylinder 66 and the piston 88 are sealed by the X-ring 94 being maintained, the piston 88 (the proximal portion 90 and the flange 92) and the X-ring 94 are subject to the pressure of the gas from the upper side thereof (an other side), the proximal end of the anchoring pin 42 of the gear case 38 anchoring the rack 96 of the piston 88 (the rack teeth 96A) is crushed by the rack teeth 96A, and the piston 88 and the X-ring 94 are moved to the lower side (one side). Hence, the rack 96 of the piston 88 (the rack teeth 96A) is meshed with the gear wheel 52 of the pinion 50 (the pinion teeth 52A), and the pinion 50 is turned in the winding direction.

When the pinion 50 is being turned in the winding direction, the meshing portions 48A of the clutch plate 44 are moved from regions at the winding direction sides of the protrusion portions 56A of the clutch portion 56 of the pinion 50 to regions at the unwinding direction sides of the protrusion portions 56A. Thus, the projecting portions 48 of the clutch plate 44 are deformed and moved toward the outer periphery side of the clutch plate 44, while the meshing portions 48A are moved toward the outer periphery face side of the clutch recess portion 32 of the lock gear 30. Consequently, the meshing portions 48A mesh (engage) between the clutch portion 56 (the periphery faces of the protrusion portions 56A) and the lock gear 30 (the outer periphery face of the clutch recess portion 32). Thus, the pinion 50, the clutch plate 44, the lock gear 30, the torsion shaft 28 and the spool 24 are made integrally turnable. Hence, the retention pins 40 of the gear case 38 that are fitted into the fitting holes 46 of the clutch plate 44 are crushed by the outer edges of the fitting holes 46, retention of the clutch plate 44 by the gear case 38 is released, and the pinion 50, the clutch plate 44, the lock gear 30, the torsion shaft 28 and the spool 24 are integrally turned in the winding direction. As a result, the webbing 26 is wound onto the spool 24 and a restraint force on the occupant from the webbing 26 is increased.

Figure 10:
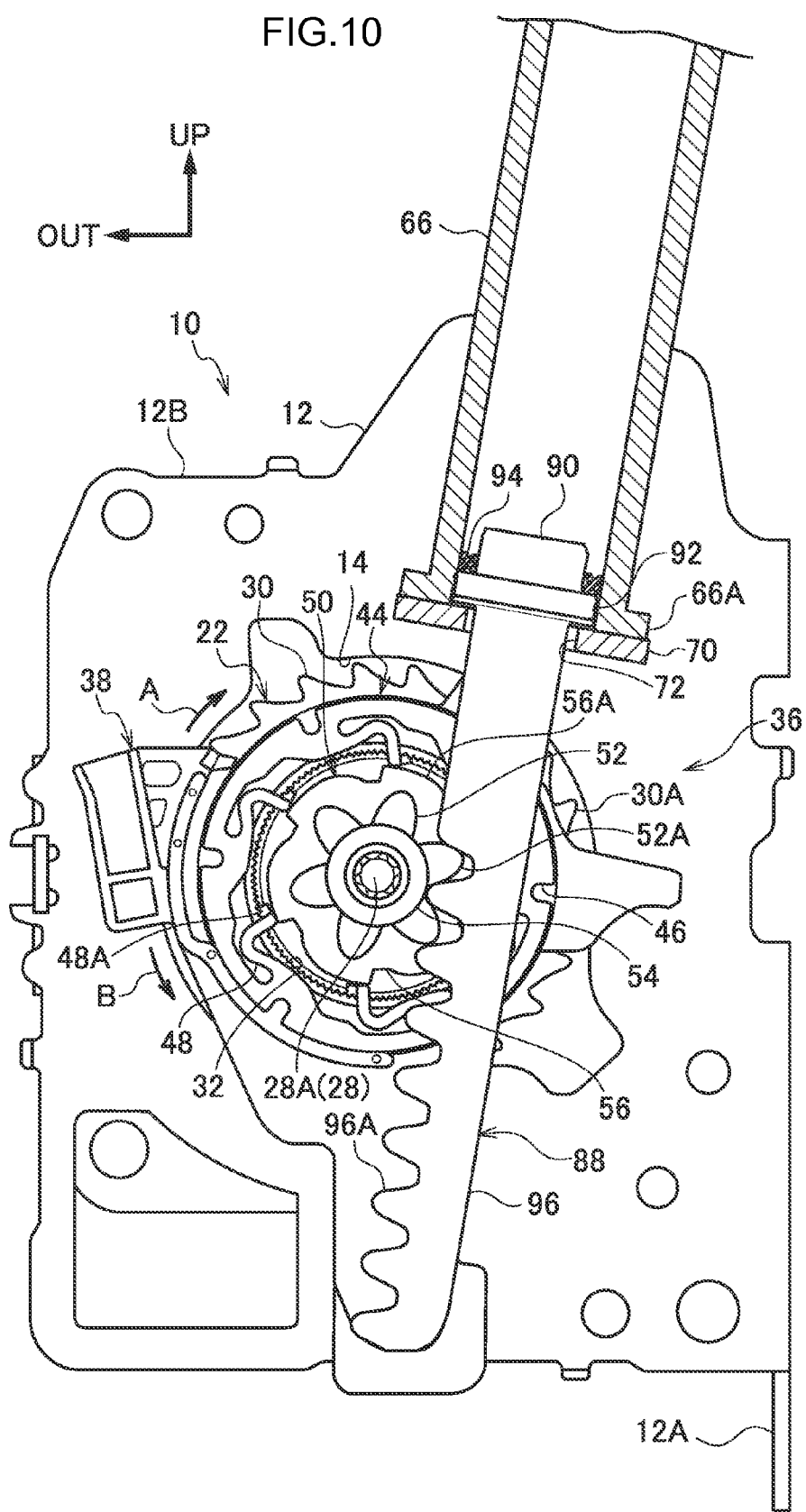
FIG. 10 is a side view, viewed from the vehicle front-and-rear direction one side, showing the webbing winding device in accordance with the exemplary embodiment of the present invention after operation of the pretensioner mechanism has finished.

As shown in FIG. 10, when at least the flange 92 of the piston 88 abuts against the piston stopper 70, movement of the piston 88 and the X-ring 94 to the lower side is stopped, and the operation of the pretensioner mechanism 36 is completed.

At usual times of the vehicle (during running and the like), in the pretensioner mechanism 36 as shown in FIG. 1A and FIG. 1B, loads from the rack 96 of the piston 88 (the rack teeth 96A) act on the anchoring pin 42 of the gear case 38 due to vibrations of the piston 88 that are caused by vibrations of the vehicle.

The axial direction dimension X of the anchoring pin 42 is small, being less than the plate thickness dimension Y of the support portion 38A of the gear case 38. Therefore, a moment acting on the anchoring pin 42 from the piston 88 (the rack teeth 96A) may be made small.

Furthermore, relative to the end face of the rack 96 (the rack teeth 96A) at the leg plate 12B side thereof, the bottom face of the facilitating cavity 42B of the anchoring pin 42 is disposed at the opposite side from the side at which the leg plate 12B is disposed. Therefore, the strength of a portion of the anchoring pin 42 at the proximal end side thereof may be increased.

Accordingly, even though the radius of curvature of the boundary region between the anchoring pin 42 and the support portion 38A is small and the facilitating cavity 42B is formed in the anchoring pin 42, rupturing of the proximal end of the anchoring pin 42 by vibrations applied to the anchoring pin 42 from the piston 88 (the rack teeth 96A) at usual times of the vehicle may be prevented (inhibited).

When the pretensioner mechanism 36 is operating, first, as shown in FIG. 2A and FIG. 2B, the piston 88 is moved to the lower side and the anchoring pin 42 is turned to the lower side about the proximal end side thereof by the rack 96 (the rack teeth 96A). Consequently, when the top end of the rack 96 touches (abuts) against the gear wheel 52 of the pinion 50 (the pinion teeth 52A), the anchoring pin 42 is completely crushed at the proximal end thereof.

Figure 3B:
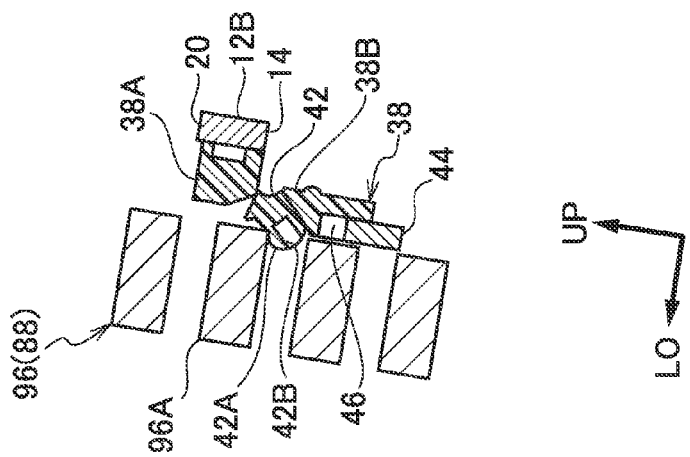
FIG. 3B is a sectional view, taken along line B-B of FIG. 3A, showing the principal portions of the pretensioner mechanism in accordance with the exemplary embodiment of the present invention at the second stage of operation.
Figure 3A:
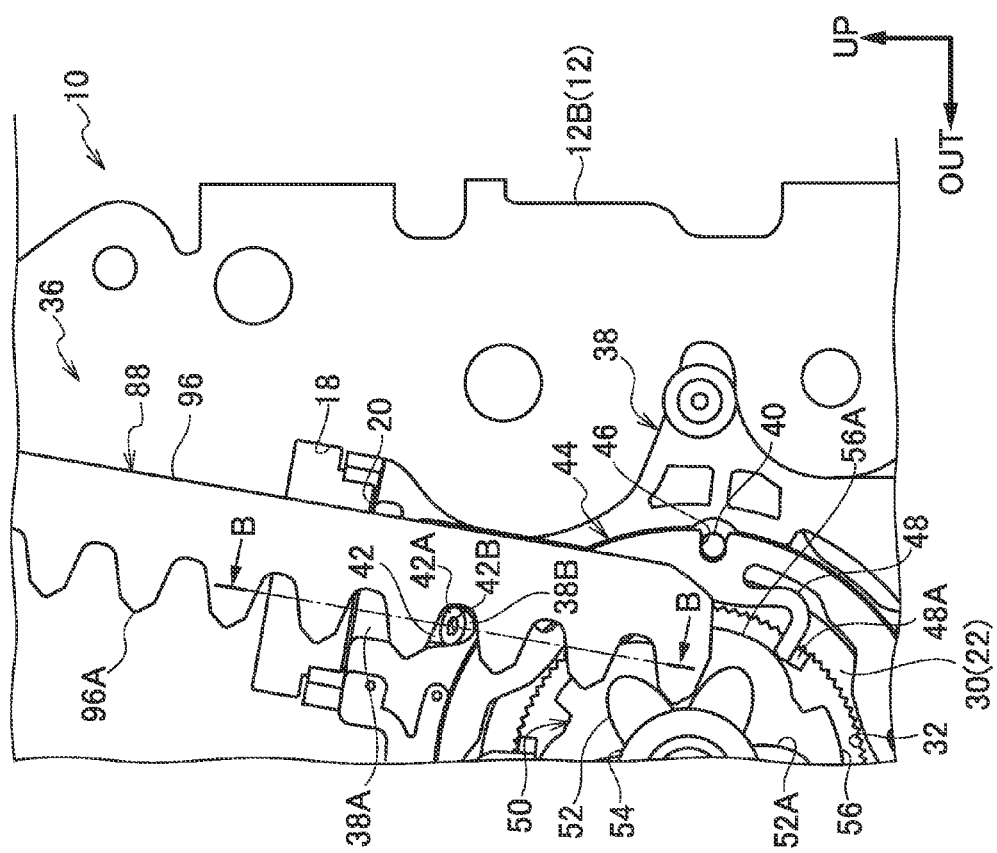
FIG. 3A is a side view, viewed from the vehicle front-and-rear direction one side, showing the principal portions of the pretensioner mechanism in accordance with the exemplary embodiment of the present invention at a second stage of operation.

Then, as shown in FIG. 3A and FIG. 3B, the rack 96 (the rack teeth 96A) meshes with the gear wheel 52 (the pinion teeth 52A) and the pinion 50 is turned in the winding direction. Thus, the meshing portions 48A of the clutch plate 44 are moved toward the outer periphery face of the clutch recess portion 32 of the lock gear 30 by the clutch portion 56 of the pinion 50 (the protrusion portions 56A), and the meshing portions 48A mesh between the clutch portion 56 (the periphery faces of the protrusion portions 56A) and the lock gear 30 (the outer periphery face of the clutch recess portion 32). At this time, the anchoring pin 42 is turned to the lower side about the proximal end side thereof by the rack 96 (the rack teeth 96A), the anchoring pin 42 is inserted (accommodated) in the upper side face (recess portion) of the receiving portion 38B of the gear case 38, and only a region at the top end side of the anchoring pin 42 (an axial direction region at which the facilitating cavity 42B is formed) is disposed between the rack teeth 96A. Movement of the anchoring pin 42 to the upper side (a sliding movement relative to the rack teeth 96A) due to the movement of the rack 96 (the rack teeth 96A) to the lower side is anchored by the support portion 38A of the gear case 38.

Then, as shown in FIG. 4A and FIG. 4B, the retention pins 40 of the gear case 38 is crushed by the peripheral edge of the fitting holes 46 of the clutch plate 44, and the pinion 50, the clutch plate 44 and the lock gear 30 are integrally turned in the winding direction. At this time, in the state in which movement of the anchoring pin 42 to the upper side due to the movement of the rack 96 (the rack teeth 96A) to the lower side is anchored by the support portion 38A of the gear case 38, an upper side portion of the top end side region of the anchoring pin 42 is crushed and deformed (destroyed) in the diametric dimension thereof by the movement of the rack 96 (the rack teeth 96A) to the lower side.

Then, as shown in FIG. 5A and FIG. 5B, the pinion 50, the clutch plate 44 and the lock gear 30 are integrally turned further in the winding direction. At this time, in the state in which movement of the anchoring pin 42 to the upper side due to the movement of the rack 96 (the rack teeth 96A) to the lower side is anchored by the support portion 38A of the gear case 38, a lower side portion of the top end side region of the anchoring pin 42 is crushed and deformed (destroyed) in the diametric dimension by the movement of the rack 96 (the rack teeth 96A) to the lower side, and is severed (divided).

As described above, both the slope surface 42A and the facilitating cavity 42B are formed at the anchoring pin 42, and crushing deformation of the anchoring pin 42 in the diametric dimension due to the movement of the rack 96 (the rack teeth 96A) to the lower side is facilitated by both the slope surface 42A and the facilitating cavity 42B. Therefore, the anchoring pin 42 may be easily crushed and deformed in the diametric dimension by the movement of the rack 96 (the rack teeth 96A) to the lower side, and may be severed. Thus, the action of the anchoring pin 42 that is caused by the movement of the rack 96 (the rack teeth 96A) to the lower side may be effectively made consistent, and blocking of movement of the piston 88 (the rack 96) to the lower side by the anchoring pin 42 may be effectively suppressed. Thus, movement of the piston 88 to the lower side may be effectively made consistent, and operational performance of the pretensioner mechanism 36 may be effectively made consistent.

Furthermore, because the facilitating cavity 42B extends in the axial direction of the anchoring pin 42, the anchoring pin 42 may be even more easily crushed and deformed in the diametric direction by the movement of the rack 96 (the rack teeth 96A) to the lower side and may be severed. Thus, the action of the anchoring pin 42 caused by the movement of the rack 96 (the rack teeth 96A) to the lower side may be even more effectively made consistent, and blocking of movement of the piston 88 (the rack 96) to the lower side by the anchoring pin 42 may be even more effectively suppressed.

In addition, the facilitating cavity 42B is formed at the top end side region of the anchoring pin 42 and the rack 96 (the rack teeth 96A) abuts against the top end side region of the anchoring pin 42 at which the facilitating cavity 42B is formed. Therefore, the anchoring pin 42 may be even more easily crushed and deformed in the diametric direction by the movement of the rack 96 (the rack teeth 96A) to the lower side and may be severed. Thus, the action of the anchoring pin 42 caused by the movement of the rack 96 (the rack teeth 96A) to the lower side may be even more effectively made consistent, and blocking of movement of the piston 88 (the rack 96) to the lower side by the anchoring pin 42 may be even more effectively suppressed.

The receiving portion 38B of the gear case 38 is provided between the anchoring pin 42 and the clutch plate 44. Thus, the receiving portion 38B prevents (inhibits) contact between the crushed anchoring pin 42 and the clutch plate 44. Therefore, the action of the anchoring pin 42 that is caused by the movement of the rack 96 (the rack teeth 96A) to the lower side may be effectively made consistent, and blocking of turning of the clutch plate 44 in the winding direction by the anchoring pin 42 may be effectively suppressed. Thus, turning of the clutch plate 44 in the winding direction may be effectively made consistent, and operational performance of the pretensioner mechanism 36 may be even more effectively made consistent.

The receiving portion 38B covers the anchoring pin 42 side region of the clutch plate 44 in the whole of the plate thickness direction, and further prevents (inhibits) contact between the crushed anchoring pin 42 and the clutch plate 44. Therefore, the action of the anchoring pin 42 that is caused by the movement of the rack 96 (the rack teeth 96A) to the lower side may be even more effectively made consistent, and blocking of turning of the clutch plate 44 in the winding direction by the anchoring pin 42 may be even more effectively suppressed.

The crushed anchoring pin 42 is inserted into the upper side face (the recess portion) of the receiving portion 38B, and movement of the anchoring pin 42 in the circumferential direction of the gear case 38 is restricted. Thus, contact between the crushed anchoring pin 42 and the clutch plate 44 is further prevented (inhibited). Therefore, the action of the anchoring pin 42 that is caused by the movement of the rack 96 (the rack teeth 96A) to the lower side may be even more effectively made consistent, and blocking of turning of the clutch plate 44 in the winding direction by the anchoring pin 42 may be even more effectively suppressed.

The slope surface 42A is formed between the top end face and the periphery face of the anchoring pin 42 of the gear case 38. Therefore, the anchoring pin 42 can be inserted between the rack teeth 96A of the piston 88 (the rack 96), and when the piston 88 and the gear case 38 are being assembled, a movement of the rack teeth 96A is guided by the slope surface 42A. Thus, the anchoring pin 42 may be easily inserted between the rack teeth 96A, the piston 88 and the gear case 38 may be easily assembled, and assembly of the pretensioner mechanism 36 may be made easier.

FIRST VARIANT EXAMPLE

Figure 11:
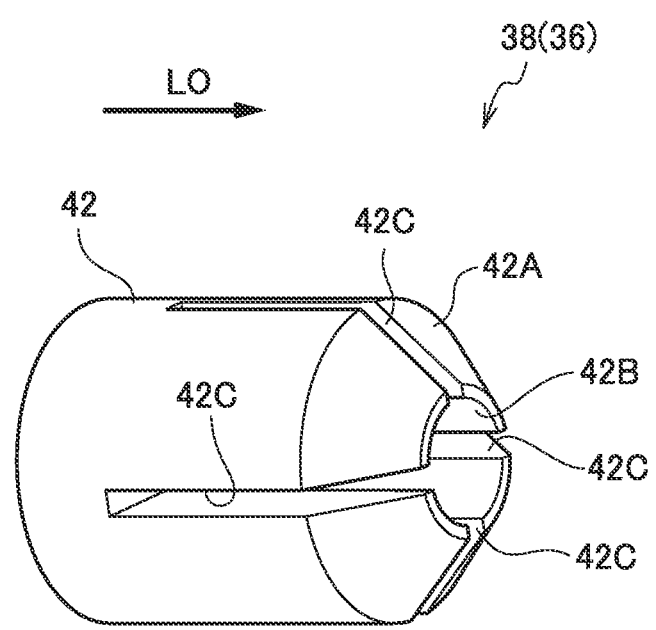
FIG. 11 is a perspective view showing a first variant example of an anchoring pin of the pretensioner mechanism.

FIG. 11 is a perspective view showing a first variant example of the anchoring pin 42 of the pretensioner mechanism 36.

In the present variant example, as well as the facilitating cavity 42B being formed in the top end side region of the anchoring pin 42, a predetermined number (four in this embodiment) of supplementary holes 42C with rectangular shapes in cross section that serve as facilitating portions are formed in the top end side region of the anchoring pin 42. The supplementary holes 42C are provided to be parallel with the axial direction (length direction) and the diametric direction of the anchoring pin 42, and extend (are made long) in the axial direction of the anchoring pin 42. The supplementary holes 42C open in the top end face, the periphery face, and the slope surface 42A of the anchoring pin 42. The supplementary holes 42C are in communication with the facilitating cavity 42B, and bottom faces of the supplementary holes 42C are coplanar with the bottom face of the facilitating cavity 42B. The predetermined number of supplementary holes 42C are arranged at equal intervals in the circumferential direction of the anchoring pin 42.

In the present variant example too, the same operations and effects as in the exemplary embodiment described above are provided.

In the present variant example, the supplementary holes 42C are in communication with the facilitating cavity 42B. However, the supplementary holes 42C need not be in communication with the facilitating cavity 42B.

SECOND VARIANT EXAMPLE

Figure 12:
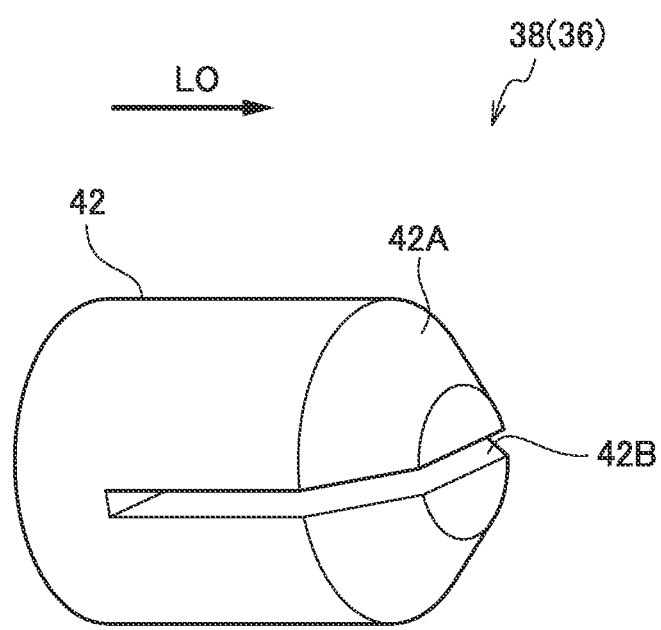
FIG. 12 is a perspective view showing a second variant example of the anchoring pin of the pretensioner mechanism.

FIG. 12 is a perspective view showing a second variant example of the anchoring pin 42 of the pretensioner mechanism 36.

In the present variant example, the facilitating cavity 42B is formed in a shape with a rectangular cross section in the top end side region of the anchoring pin 42. The facilitating cavity 42B is provided along the axial direction (length direction) of the anchoring pin 42, and extends (is made long) in the axial direction of the anchoring pin 42. The facilitating cavity 42B opens in the top end face, the periphery face, and the slope surface 42A of the anchoring pin 42. The facilitating cavity 42B penetrates through the anchoring pin 42 in the diametric direction.

In the present variant example too, the same operations and effects as in the exemplary embodiment described above are provided.

In the present variant example, one of the facilitating cavity 42B is formed at the anchoring pin 42. However, a plural number of the facilitating cavity 42B may be formed at the anchoring pin 42. In this case, the plural facilitating cavities 42B may be arranged at equal intervals in the circumferential direction of the anchoring pin 42.

THIRD VARIANT EXAMPLE

Figure 13:
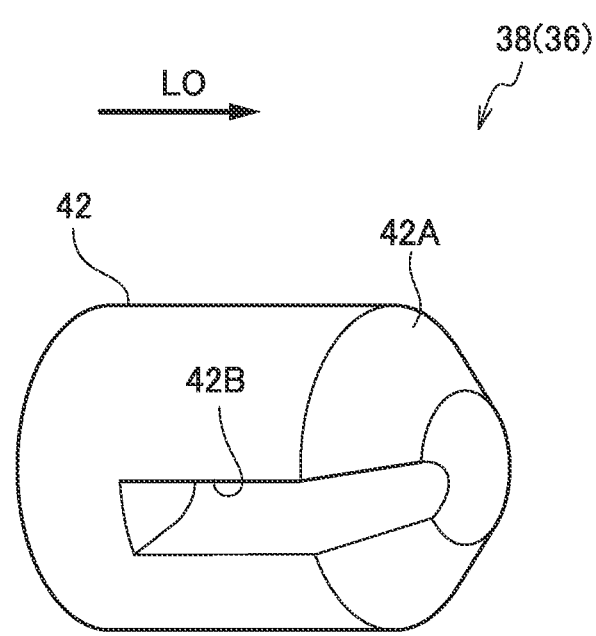
FIG. 13 is a perspective view showing a third variant example of the anchoring pin of the pretensioner mechanism.

FIG. 13 is a perspective view showing a third variant example of the anchoring pin 42 of the pretensioner mechanism 36.

In the present variant example, the facilitating cavity 42B is formed in a shape with a semi-ellipsoid cross section at a circumferential portion of the top end side region of the anchoring pin 42. The facilitating cavity 42B is provided in parallel with the axial direction (length direction) of the anchoring pin 42, and extends (is made long) in the axial direction of the anchoring pin 42. The facilitating cavity 42B opens in the top end face, the periphery face, and the slope surface 42A of the anchoring pin 42, and the facilitating cavity 42B penetrates into the anchoring pin 42 in the diametric direction.

In the present variant example too, the same operations and effects as in the exemplary embodiment described above are provided.

In the present variant example, one of the facilitating cavity 42B is formed at the anchoring pin 42. However, a plural number of the facilitating cavity 42B may be formed at the anchoring pin 42. In this case, the plural facilitating cavities 42B may be arranged at equal intervals in the circumferential direction of the anchoring pin 42.

Furthermore, in the present variant example the facilitating cavity 42B reaches the top end face of the anchoring pin 42 and opens in the top end face of the anchoring pin 42. However, the facilitating cavity 42B need not reach the end face of the anchoring pin 42 or open in the top end face of the anchoring pin 42.

FOURTH VARIANT EXAMPLE

Figure 14:
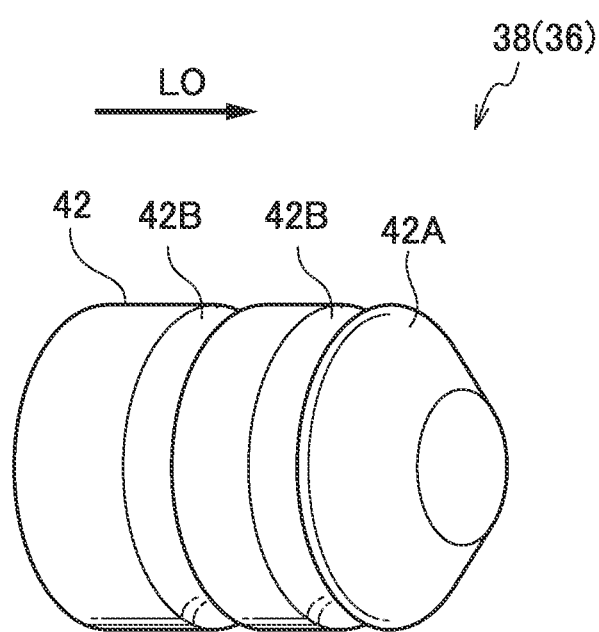
FIG. 14 is a perspective view showing a fourth variant example of the anchoring pin of the pretensioner mechanism.

FIG. 14 is a perspective view showing a fourth variant example of the anchoring pin 42 of the pretensioner mechanism 36.

In the present variant example, a predetermined number (two in this embodiment) of the facilitating cavity 42B are formed in shapes with semi-circular cross-sections in the periphery face of the top end side region of the anchoring pin 42. The facilitating cavities 42B are provided along the circumferential direction of the anchoring pin 42, and open in the periphery face of the anchoring pin 42.

In the present variant example too, the same operations and effects as in the exemplary embodiment described above are provided.

In the present variant example, the same facilitating cavity 42B as in the exemplary embodiment described above, with a circular tube shape, may be additionally formed coaxially in the anchoring pin 42.

In the exemplary embodiment described above (including the first to fourth variant examples), the facilitating cavity 42B and/or supplementary holes 42C are formed in the anchoring pin 42 to serve as facilitating portions. However, a low-strength portion with a lower strength than other portions of the anchoring pin 42 may be provided in the anchoring pin 42 to serve as the facilitating portion.

The exemplary embodiment described above (including the first to fourth variant examples) has a structure in which a restraining force on an occupant from the webbing 26 is increased by the piston 88 (the moving member) being moved. However, structures are possible in which the restraining force on the occupant from the webbing 26 is increased by a moving body (the moving member) such as a ball or the like being moved.

The present invention may be applied to mechanisms in seatbelt devices that are operated by movements of moving members, such as a switching mechanism of a selectable force limiter, a lap belt pretensioner mechanism, a buckle pretensioner mechanism or the like.

The invention claimed is:

1. A pretensioner mechanism comprising:
 a webbing that is capable of restraining an occupant of a vehicle;
 a moving member, a restraining force on the occupant from the webbing being increased by the moving member being moved; and
 an anchoring portion that is formed in a rod shape and inhibits movement of the moving member by anchoring the moving member, a slope surface being provided between a top end face and a side face of the anchoring portion, movement of the moving member being allowed by the anchoring portion being crushed, and the anchoring portion being provided with a facilitating portion that facilitates crushing of the anchoring portion in a diametric direction thereof by movement of the moving member.

2. The pretensioner mechanism according to claim 1, wherein the facilitating portion is provided at a region of the anchoring portion at a top end side thereof.

3. The pretensioner mechanism according to claim 1, wherein the facilitating portion extends in an axial direction of the anchoring portion.

4. The pretensioner mechanism according to claim 1, wherein the facilitating portion extends in at least one of the diametric direction or a circumferential direction of the anchoring portion.

5. The pretensioner mechanism according to claim 1, wherein an axial direction position of the anchoring portion at which the facilitating portion is provided opposes the moving member in a movement direction of the moving member.

6. The pretensioner mechanism according to claim 1, wherein the facilitating portion is disposed at a periphery face of the anchoring portion.

7. The pretensioner mechanism according to claim 1, wherein the anchoring portion is severed by the movement of the moving member.

8. The pretensioner mechanism according to claim 1, wherein a region of the anchoring portion at a proximal end side thereof, at which region the facilitating portion is not provided, opposes the moving member in a movement direction of the moving member.

9. The pretensioner mechanism according to claim 1, wherein a length of the facilitating portion is substantially the same as the length of the anchoring portion that extends only partially across a width of the moving member.

10. The pretensioner mechanism according to claim 9, wherein the facilitating portion of the anchoring portion includes a recess that extends in an axial direction of the anchoring portion.

11. The pretensioner mechanism according to claim 1, wherein the anchoring portion anchors the moving member by extending into a recess of the moving member in a widthwise direction.

12. The pretensioner mechanism according to claim 1, wherein the rod-shaped anchoring portion is supported at only one end, with its free opposite end extending only partially across a width of the moving member.

13. The pretensioner mechanism according to claim 1, wherein the moving member is linear and moves along a linear axis, and wherein the anchoring portion extends only partially across a width of the moving member.

14. A pretensioner mechanism comprising:
 a webbing that is capable of restraining an occupant of a vehicle;
 a moving member that is capable of moving;
 an anchoring portion that anchors movement of the moving member, movement of the moving member being allowed by the anchoring portion being crushed;
 a turning member, the turning member being turned and a restraining force on the occupant from the webbing being increased by the moving member being moved; and
 a receiving portion that is provided between the anchoring portion and a clutch plate, the receiving portion inhibiting contact between the crushed anchoring portion and the clutch plate.

15. The pretensioner mechanism according to claim 14, wherein the anchoring portion includes a facilitating portion that facilitates crushing of the anchoring portion in a diametric direction thereof by movement of the moving member, and a length of the facilitating portion is substantially the same as the length of the anchoring portion that extends only partially across a width of the moving member.

16. The pretensioner mechanism according to claim 15, wherein the facilitating portion of the anchoring portion includes a recess that extends in an axial direction of the anchoring portion.

17. The pretensioner mechanism according to claim 14, wherein the anchoring portion anchors the moving member by extending into a recess of the moving member in a widthwise direction.

18. The pretensioner mechanism according to claim 14, wherein the rod-shaped anchoring portion is supported at only one end, with its free opposite end extending only partially across a width of the moving member.

19. The pretensioner mechanism according to claim 14, wherein the moving member is linear and moves along a linear axis, and wherein the anchoring portion extends only partially across a width of the moving member.

* * * * *